United States Patent
Günther

(10) Patent No.: US 6,273,706 B1
(45) Date of Patent: Aug. 14, 2001

(54) VALVE NOZZLE HAVING A PRESSURE-RELIEF MEANS

(75) Inventor: Herbert Günther, Allendorf/Eder (DE)

(73) Assignee: Gunther Heisskanaltechnik GmbH, Frankenberg (DE)

( * ) Notice: Subject to any disclaimer, the term of this patent is extended or adjusted under 35 U.S.C. 154(b) by 0 days.

(21) Appl. No.: 09/285,802

(22) Filed: Apr. 5, 1999

(30) Foreign Application Priority Data

Jun. 3, 1998 (DE) .............................. 298 09 855

(51) Int. Cl.$^7$ .............................................. B29C 45/23
(52) U.S. Cl. ................................... 425/564; 425/566
(58) Field of Search ........................ 425/543, 562, 425/563, 564, 565, 566

(56) References Cited

U.S. PATENT DOCUMENTS

| 4,582,224 | * | 4/1986 | Proksa et al. | 425/562 |
| 4,836,766 | * | 6/1989 | Gellert | 425/564 |
| 5,830,524 | * | 11/1998 | Braun | 425/562 |

FOREIGN PATENT DOCUMENTS

| 3245571 | 6/1984 | (DE) . |
| 3403603 | 8/1985 | (DE) . |
| 29609356 | 8/1996 | (DE) . |
| 19717381 | 11/1997 | (DE) . |
| 3833220 | 4/1998 | (DE) . |
| 0374346 | 5/1993 | (EP) . |

* cited by examiner

*Primary Examiner*—Tim Heitbrink
(74) *Attorney, Agent, or Firm*—Israel Gopstein

(57) ABSTRACT

A valve-type nozzle (10) is provided for use in hot runner systems through which a plastic material melt is fed under high pressure to a separable and coolable tool having at least one mold cavity (K) for injection-molded items. The nozzle is heatable and comprises at least one needle valve (20) supported by sliding guides (28, 38), the arrangement being such that the melt, which is fed trough a material pipe (14), passes around at least a lower section (22) of the needle valve (20). The nozzle (10) further comprises, in an antechamber (30) upstream of the mold cavity (K), at least one outlet (18) adapted to receive a closely fitting needle end (24). The needle valve (20) includes in its lower section (22), upstream of the needle end, a pressure-relief arrangement that is in direct flow-connection with the antechamber (30). The pressure-relief arrangement comprises, in a guide piece (40), at least one branch-off bore (32; 34) that runs radially at an angle of 90° to the longitudinal direction (L) of the needle valve (10).

14 Claims, 2 Drawing Sheets

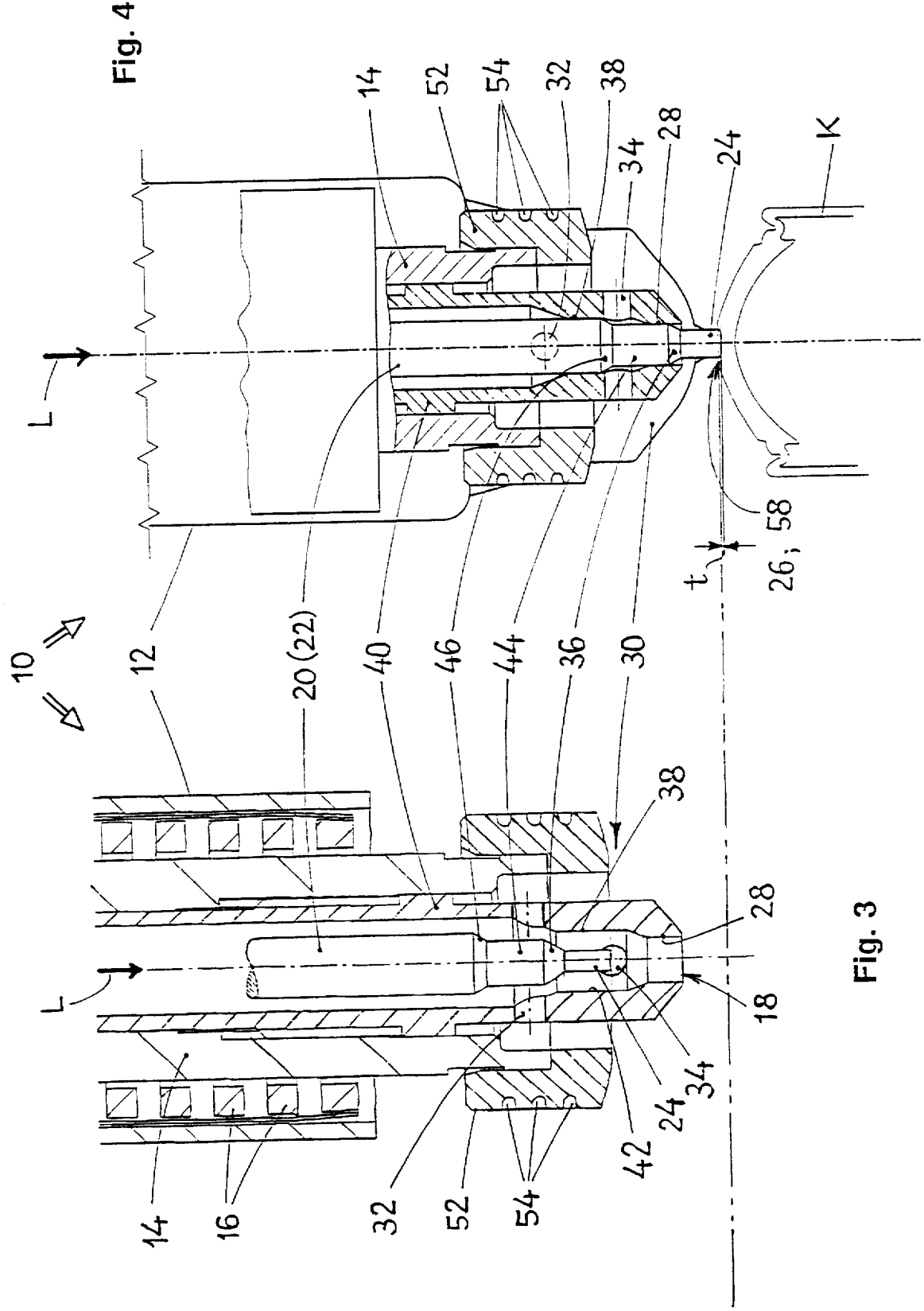

VALVE NOZZLE HAVING A PRESSURE-RELIEF MEANS

SPECIFICATION

Figure 1:
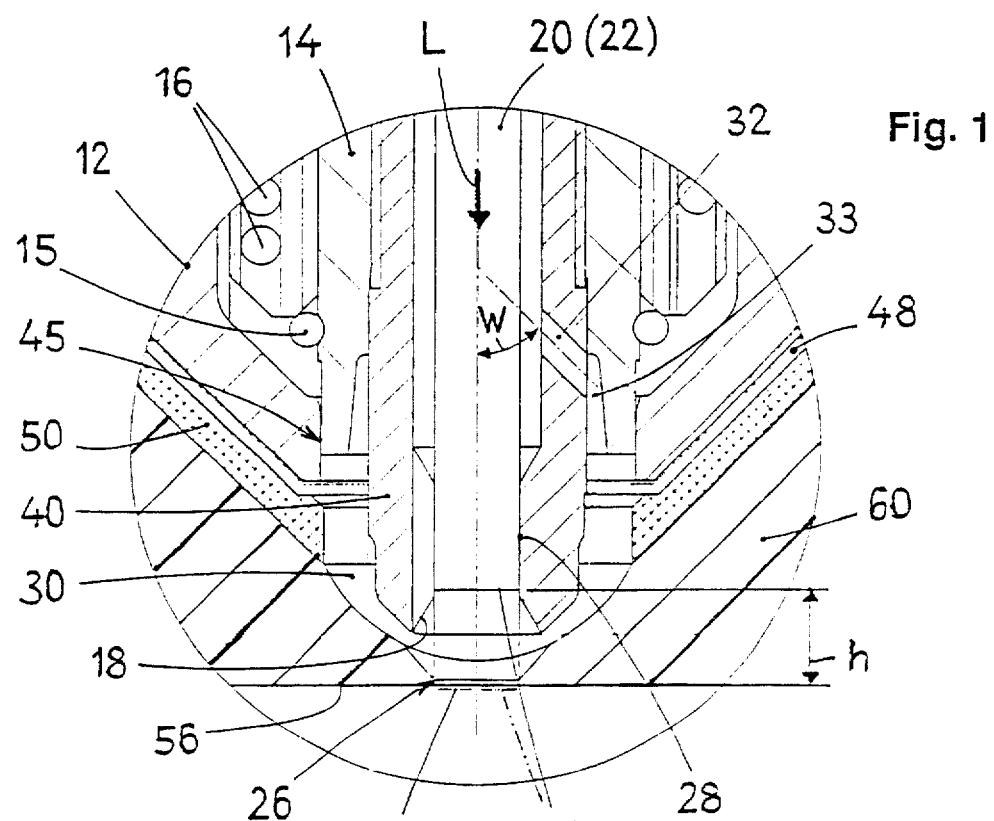

The present invention relates to a valve-type nozzle.

In injection molds, such nozzles are installed with hot runner systems through which a plastic material melt is fed at a temperature of e.g. 200° C. under high pressure to a separable tool block that has a mold cavity and can be cooled so that the injection-molded item will quickly solidify. Depending on the material, nonuniformities such as "cold slugs" or stress-loaded areas may develop at the gate because of the abrupt temperature transition and owing to possible flow obstructions.

Furthermore, very accurate dosing of material is important and has to be warranted even with rapid succession of shots, especially for products of small dimensions. In valve-type nozzles, usually a conical tip of a generally piston-driven needle valve is employed to open and close a gate opening periodically. Since extremely high pressures of e.g. far more than 1,000 bars are effective, precise sealing in the closed position is just as necessary as exact guidance of the needle valve.

DE 3403 603 A1 describes a positively controlled needle valve for injection nozzles wherein piston guides for needle valves are provided above a distributor or manifold plate penetrated thereby; underneath said distributor, the needle valves are supported in sliding guides. Feeding channels below lead into a hot runner for a melt coming from the distributor, which flows around each needle valve and out of the hot runner so long as a needle-valve end journal will not seal a closing piece (a gate ring).

Later on, special needle sections were proposed, e.g. according to DE 197 17 381 A1, a projection or triangular bevels adjacent the needle tip. Relatively difficult to produce are radial webs provided at the lower end of the nozzle or needle sleeve, respectively, which enclose the needle valve concentrically. For a nozzle with internal heating in the upper part, EP 0 781 640 A2 provides a guide head that is integral with the needle valve, slides into an externally heated bushing and has inclined material outlets.

According to DE 32 45 571 A1, there is in the area of the needle tip a precentering body which has radial passages. However, owing to its close fit in a heat-conducting nozzle, heat losses occur that are particularly undesirable near the gate. EP 0 374 346 B1 provides lips that partially enclose the needle valve and leave only a lateral longitudinal channel open for feeding material. According to DE 296 09 356 U1, such a feed channel may be designed as an inclined needle-valve recess that passes over to a narrow centric channel on which a narrow circumferential slot forms a material outlet for injection molding of very flat items from their narrow side.

The known arrangements have in common a drawback that, in spite of considerable mechanical design efforts, reliable guidance of the needle valve is not always guaranteed under high injection pressures. Eccentric loads will not only cause a high degree of wear, but will also provoke flow irregularities in the molten material whereby the quality of finished products may be degraded.

It is an important object of the invention to overcome these and other disadvantages of the prior art by simple means and to produce an improved valve-type nozzle in which an off-balance flow load is avoided and perfect needle guidance is warranted. It is another object of the invention to apply its design principle to positively controlled valve-type nozzles as well as to individual nozzles provided with needle valves that are piston-driven either directly or via shift levers.

The features of the invention are specified in the appended claims. In accordance with the invention, a valve-type nozzle as mentioned initially for hot runner systems through which a plastic material melt is fed under high pressure to a separable and coolable tool having at least one mold cavity for injection-molded items, which nozzle is heatable and comprises at least one needle valve supported by sliding guides within the nozzle, such that the melt fed through a material pipe passes around at least a lower section of the needle valve, and further comprising upstream of a mold cavity in an antechamber at least one outlet adapted to receive a closely fitting needle, the invention provides that the needle valve includes, in a lower section upstream of the needle end, pressure-relief means in direct flow-connection with the antechamber. Therefore, as the needle end enters the outlet during the closing phase and the melt mass present in the antechamber is inevitably displaced, the resulting material compression and pressure boost will automatically even out.

According to one aspect of the invention, the pressure-relief means comprises in a guide piece at least one branch-off bore that runs e.g. radially to the longitudinal direction of the needle, at any rate at an angle which, in accordance with another feature of the invention, is smaller than or equal to 90°. In particular, according to a further feature, the or any branch-off bore may extend through the guide piece in a transverse or inclined direction. It will be recognized that such pressure relief means can be produced with a minimum of manufacturing effort.

The same applies if optionally or additionally there is, according to still another feature of the invention, in the lower section of the material pipe and in a transverse or inclined direction thereto, at least one branch-off bore an end of which opens exactly into a top zone of a free space that leads to the antechamber and is provided between the material pipe and a mouthpiece. This bore will permit or assist melt flushing and will also contribute to the pressure relief in the antechamber. In order to obtain a pressure distribution as uniform as possible, another aspect of the invention provides a group of bores at the periphery of the material pipe and/or of the guide piece, advantageously in a radial or star-type array.

Still another feature of the invention provides in the nozzle a two-stage centering device for the or any needle valve, whereby secure fit at the valve seat is guaranteed, e.g. in the fashion of a cylindrical or conical seal. In particular, according to yet another aspect of the invention, precentering means for the valve needle serve to pilot it towards the sealing face so that wear which cannot be totally avoided under heavy material load will be reduced to an absolute minimum. For this purpose, the lower needle section may, according to still another feature of the invention, have at least one taper or shoulder to be introduced in a self-centering manner into a matching internal profile of a guide piece associated to the material pipe. Although it has been known from DE 38 33 220 C2 to use, in addition to a sealed upper piston guide, a double cone at a needle tip as a lower precentering device, no pressure relief at all from the antechamber is provided in the conventional design so that a large pressure boost will occur each time the needle valve moves into its closing position. According to the present invention, however, pressure relief will always subsequently be effected via a gap between the needle valve and the mouthpiece.

According to still another aspect of the invention, the shaft of the needle is advantageously arranged above an upper taper or shoulder in an upper guide by which it is slidably enclosed. Optionally or in addition, a smaller diameter shaft portion of the needle may, by yet another aspect of the invention, be shiftable with close fit in a lower guide located above a lower taper.

In line with still other concepts of the invention, the guide piece may advantageously have two transverse bores arranged at an axial distance, which bores can be arranged at an angle to each other, in particular at right angles and staggered in height. By extremely simple means, this arrangement will thus warrant pressure relief under especially favorable flow conditions.

Figure 2:
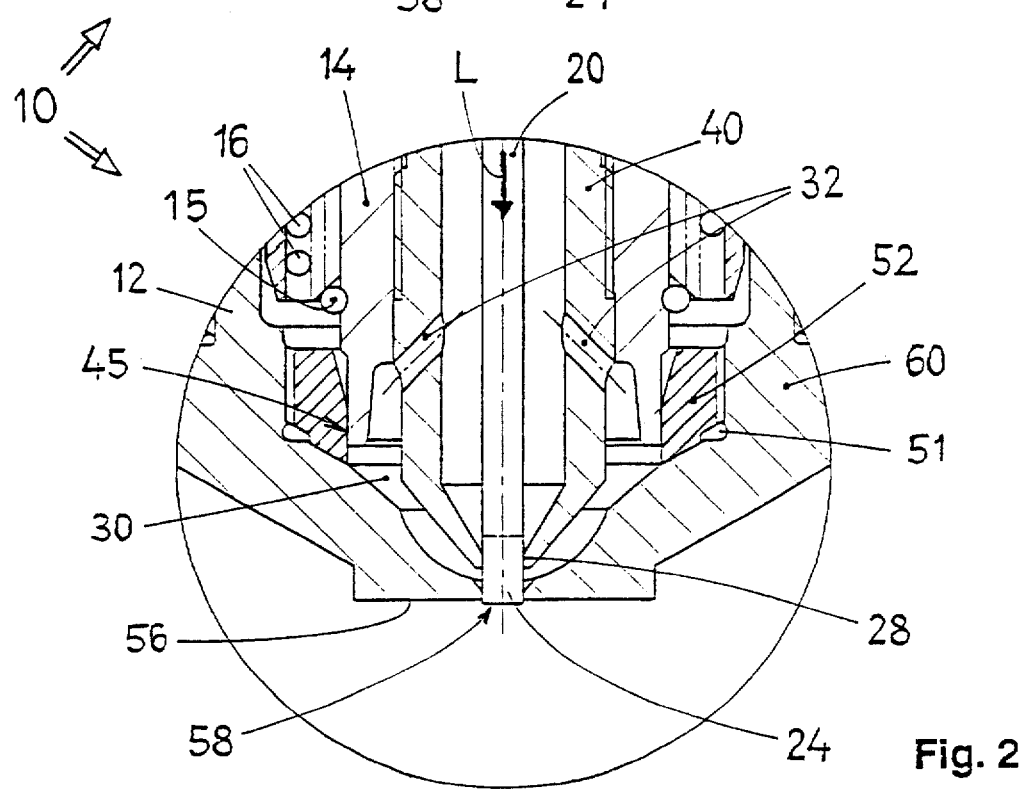

Further features, details and advantages of the invention will be evident from the wording of the claims as well as from the following description of embodiment examples by way of the drawing wherein:

FIG. 1 is an enlarged axial section view of the lower end of a valve-type nozzle, FIG. 2 is a similar axial section view of a different nozzle design, FIG. 3 is a simplified axial section view of a valve-type nozzle in an open position and FIG. 4 is a view corresponding to FIG. 3, but in a closed position.

FIG. 1 shows the lower part of a valve-type nozzle generally designated by 10 including, within a nozzle body 12, a material pipe 14 with an external heating device which is designed as a heater coil 16 in the example shown. A retainer ring 15 ensures the correct position of the heating device on the material pipe 14 whose lower end is screwed to a mouthpiece or guide piece 40 having an outlet 18 at its lower end. Guide piece 40 is made of a material of high thermal conductivity, e.g. above 80 W/m K.

Centrally in the material pipe 14, there is a needle valve 20 whose lower section 22 has an end piece 24, e.g. a plug or pin, that sealingly fits a valve seat 26 when the needle valve 20 is in its down position. A lower guide 28 ensures an exactly concentric position of the end piece 24 that is adjustable by the height of the needle stroke h between an open position indicated by continuous lines and a closed position indicated by dash-and-dot lines. In the embodiment shown, the lower guide 28 comprises three radial webs which enclose the end piece 24 concentrically, though in a slidable manner.

Below the nozzle body 12 an insulating gap 48 is provided that in this embodiment is partly taken up by a filling body 50 of high-temperature resistance. A bush 60 confines an antechamber 30 and has a flow outlet 58 at a tool contact surface 56.

As the needle 20 moves downward after the injection process, the melt in the antechamber 30 will be exposed to high pressure by the displacement volume of the end piece 24. In order that the mass can evade, the guide piece 40 is provided with at least one branch-off bore 32 whose outer end leads exactly into the top region of a free space or recess 33 provided between the material pipe 14 and the mouthpiece 40. Thus the bore 32 will cause or at least assist a flushing effect for the melt and will, in addition, provide pressure relief in the antechamber 30.

The branch-off bore 32 or a group of branch-off bores 32, respectively, is preferably located at an angle W of e.g. 45° to the axis or longitudinal direction L of the needle valve 20. Distributed over the circumference, e.g. three or four of such branch-off bores 32 may be provided in order to achieve uniform pressure distribution. A close fit 45 between the lower ends of nozzle body 12 and of material pipe 14 is important. For this purpose, the recess 33 is advantageously designed so that the injection pressure will increase the sealing effect by allowing resilient expansion of the bottom end of material pipe 14. The insulating gap 48 provided below and the filling body 50 serve to minimize heat losses between the heated material pipe 14 and the antechamber bush 60 as well as the tool, respectively.

The construction shown in FIG. 2 is generally similar. For supporting the material pipe 14, a titanium ring 52 is provided. Its small heat conductivity of e.g. below 10 W/m K and insulating gaps substantially contribute to minimizing heat flow out towards the antechamber bush 60. A tight fit of ring 52 to the tool contact face 56 is ensured by a recess or undercut 51 therein (FIG. 2). It will be noted that the branch-off bores 32 in the guide piece 40 are arranged symmetrically opposite each other.

With a basically comparable design, the embodiment represented in FIGS. 3 and 4 shows (if simplified) at the guide piece 40 an upper transverse bore 32 and a lower transverse bore 34 at an axial distance and at right angles to each other. The titanium ring 52 may be provided with peripheral grooves 54 in order to reduce the contact surface and, consequently, heat dissipation towards the casing.

Furthermore, the lower section 22 of needle valve 20 is tapered by two steps. It will be seen that an upper taper or shoulder 46 is joined by a shaft piece 44 of smaller diameter. A transition from a lower taper or shoulder 36 is followed by the cylindrical end piece or pin 24. Here, guide piece 40 is provided with a matching internal profile 42 at its lower end. When moving down from the open position (FIG. 3), needle valve 20 is first prethreaded or guided by its upper shoulder 46 in a cone-shaped area of the internal profile 42 at the level of bore 32. As the closing operation progresses, the lower shoulder 36 will self-center at lower guide 28 so that pin 24 fits exactly into the valve seat 26. The lower guide 28 is designed with very close fit so that pressure-tight sealing is achieved in the closed valve position. Molten material present under high pressure in the antechamber 30 will be automatically relieved via the bores 32, 34. It will be seen from FIGS. 3 and 4 that transverse bore 34 between guides 28 and 38 of guide piece 40 is not entirely closed by the intermediate shaft piece 44, whereby melt may escape into the antechamber 30. (In this connection be it remarked that in FIG. 4, the arrangement of guide piece 40 and needle valve 20 is shown in offset or swivelled by 90° as against FIG. 3.) In addition, FIG. 4 indicates a mold cavity K provided in the tool (not shown) for receiving the melt that solidifies to become a plastic material item.

It will be realized that in the embodiments of FIGS. 3 and 4, the needle valve 20 is guided by two steps towards the transfer opening 58 to the tool so that the lower needle section 22 is precisely threaded first into upper guide 38 and then into lower guide 28. Therefore, the needle end 22 will penetrate into the valve seat 26 practically without any abrasion or wear. The sealing end seat 26, 58 may be cylindrical or conical as required. Its immersion depth t (FIG. 4) may for example be between 0.2 mm and 0.3 mm.

Despite extremely high melt pressure, the invention can because of its two-step bottom guide centering dispense with conventional guides formerly provided in more upward or inward nozzle portions. The upper guide 38 is, in fact, a precentering device that still permits some clearance, e.g. 0.2 mm in diameter. The guide piece 40 may be provided with this upper guide 38 already during manufacture, without any subsequent reworking. Once the guide piece 40 has been screwed into the material pipe 14, the lower guide 28 can be fine-ground concentrically to the material pipe 14 so that the shaft part 44 together with the lower taper 36 and the end piece or pin 24, respectively, are led to and into the transfer opening 58 of the tool essentially free of play. This fact greatly contributes to long service life and reliable operation.

The invention is not limited to any of the embodiments described herein, but is apt to be modified in many ways. In particular it is also applicable to cold runner devices wherein the material pipe is cooled and the tool is heated. The term melt is, therefore, understood here to also comprise cold fluid masses that solidify under heat, e.g. of an endothermic reaction. However, it will be noted that a preferred valve-type nozzle 10 for hot runner systems, through which a plastic material melt is fed to a separable and coolable tool that has at least one mold cavity K for injection-molded items, includes according to the invention at least one slidably supported needle valve 20 which valve may be flooded at least in a lower zone by the melt advanced through a material pipe 14. A needle end piece or pin 24 is adapted to be introduced with close fit into an outlet 18 arranged in front of a mold cavity K in an antechamber 30, sealing taking place at a valve seat 26 of e.g. cylindrical or conical shape.

Above and upstream of the valve seat 26, there is a pressure-relief device 32, 34 that is directly flow-connected to the antechamber 30 and comprises e.g. at least one branch-off bore 32 at a guide piece 40, running at an angle W to the longitudinal direction L of the needle. Optionally or in addition, the lower section 22 of the material pipe 14 may comprise at least one branch-off bore 34 leading to the antechamber 30, e.g. by way of a star-shaped group of bores 32, 34 at the circumference of the material pipe 14 and/or of the guide piece 40. The latter may advantageously be provided with two transverse bores 32, 34 arranged at an axial distance, i.e. vertically staggered, and in particular located at right angles to each other. The upper bore 32 permits pressure relief towards the thicker needle section (22) at the upper guide 38; the lower bore 34 provides pressure relief between the valve seat 26 at the mouthpiece 40 and the needle shoulder 36.

Furthermore it is important that the needle valve 20 is adapted to be introduced into its seat 26 in a precentered manner. For this purpose, the lower needle section 22 is provided with at least one taper or shoulder 36 for entering in a self-centering manner into the mating internal profile 42 of the guide piece 40 provided at the material pipe 14. The shaft of the needle 20 is preferably precentered in the upper guide 38, and towards the down position (FIG. 4), a thin shaft section 44 is tightly but slidably enclosed by the lower guide 28.

All and any of the features and advantages of the invention, inclusive of design details, spatial arrangements and procedural steps as evident from the claims, from the specification and/or from the drawings may be inventionally substantial both per se and in most variegated combinations.

List of Reference Symbols h needle stroke
k mold cavity

-continued

List of Reference Symbols

L longitudinal direction
t dipping depth
w angle
10 [valve-type] nozzle
12 nozzle body
14 material pipe
15 retainer ring
16 heater coil
18 outlet (orifice)
26 needle valve
22 lower section
24 end piece/pin
26 valve seat
28 lower guide
30 antechamber
32 branch-off bore(s)
33 recess
34 branch-off bore(s)
36 lower taper/shoulder
38 upper guide
40 guide piece/mouthpiece
42 internal profile
44 shaft piece
45 close fit
46 upper taper/shoulder
48 insulating gap
50 filling body
51 recess/undercut
52 titanium ring
54 peripheral grooves
56 tool contact surface
58 transfer opening
60 antechamber bush

What is claimed is:
1. A valve nozzle (10) for connection to a separable and coolable tool having at least one mold cavity (K) for forming injection-molded items,
    said nozzle (10) formed of heatable material and comprising:
    a material pipe (14) through which a plastic material melt is fed under high pressure;
    a needle valve (20); and
    sliding guides within the nozzle supporting said needle valve (20),
    said needle valve having a lower section (22) adapted to permit the melt fed through said material pipe (14) to pass around at least said lower section (22) of the needle valve (20);
    said nozzle having an antechamber (30) upstream of the mold cavity (K);
    an end piece (24) of said lower section (22) received in a closely fitting outlet (18) of said antechamber (30);
    said antechamber (30) being in direct flow-connection with a pressure-relief means (32, 34) in a portion of said lower section (22) upstream of the end piece (24),
    wherein a guide piece (40) includes a branch-off bore (32) of said pressure-relief means, said branch-off bore (32) having an angle (W) relative to a longitudinal direction (L) of said needle valve (20).

2. A nozzle as recited in claim 1, wherein said branch-off bore extends radially with respect to said needle valve (20) at said angle (W) which is in a range $$0° < W \leq 90°.$$

3. A nozzle as recited in claim 1, wherein said branch-off bore (32) extends through the guide piece transversely to said longitudinal direction (L).

4. A nozzle as recited in claim 1, wherein said branch-off bore extends through said guide piece in a direction inclined to said longitudinal direction (L).

5. A nozzle as recited in claim 1, wherein said pressure-relief means comprises a group of bores (32, 34) arranged at a periphery of one of said material pipe (14) and said guide piece (40).

6. A nozzle as recited in claim 5, wherein said pressure-relief means includes a further branch-off bore (34) located between a lower section of said material pipe (14) and said guide piece (40), said further branch-off bore (34) having an end opening directly into a top zone of a free space that leads to said antechamber (30).

7. A nozzle as recited in claim 6, wherein said further branch-off bore (34) is transversely situated relative to said material pipe (14).

8. A nozzle as recited in claim 6, wherein said further branch-off bore (34) is situated in an inclined direction relative to said longitudinal direction L.

9. A nozzle as recited in claim 5, wherein said group of bores (32, 34) includes bores arranged in a radial array.

10. A nozzle as recited in claim 5, wherein said group of bores (32, 34) includes bores arranged in a star-shaped array.

11. A valve nozzle (10) for connection to a separable and coolable tool having at least one mold cavity (K) for forming injection-molded items, said nozzle (10) formed of heatable material and comprising:

a material pipe (14) through which a plastic material melt is fed under high pressure, a needle valve (20) and sliding guides within the nozzle supporting said needle valve (20), wherein said nozzle (10) includes a two-stage centering structure for providing secure fit at a valve seat (26) with a conical seal;

said centering structure including:

precentering means for said needle valve (20), for piloting said needle valve (20) towards said valve seat (26), and a guide piece (40) associated with the material pipe (14), and an upper guide (38);

wherein a lower section (22) of said needle valve (20) has at least one tapered shoulder (46) for introducing said lower section (22) in a self-centering manner into a matching internal profile (42) of said guide piece (40), and a shaft of said needle valve (20) above said tapered shoulder (46) thereof being slidably enclosed in said upper guide (38).

12. A nozzle according to claim 11, wherein said shaft of said needle valve (20) includes a smaller diameter shaft portion (44) and a larger diameter shaft portion separated from said smaller diameter shaft portion (44) by said tapered shoulder (46), said smaller diameter shaft portion (44) being located above a lower tapered shoulder (36) on said shaft which is shiftable in a lower guide (28) for close fit of an end piece (24) thereof.

13. A nozzle according to claim 11, wherein said guide piece (40) includes two branch-off bores (32, 34) of a pressure-relief means, said two branch-off bores being axially displaced from each other and arranged at an angle relative to each other.

14. A nozzle according to claim 13, wherein said two branch-off bores (32, 34) are arranged at right angles relative to each other.

* * * * *